Dec. 11, 1951 A. N. GOLDSMITH 2,578,298

STEREOSCOPIC TELEVISION SYSTEM

Filed Oct. 25, 1946 2 SHEETS—SHEET 1

INVENTOR
ALFRED N. GOLDSMITH
BY H. S. Grover
ATTORNEY

Dec. 11, 1951 A. N. GOLDSMITH 2,578,298

STEREOSCOPIC TELEVISION SYSTEM

Filed Oct. 25, 1946 2 SHEETS—SHEET 2

INVENTOR
ALFRED N. GOLDSMITH
BY Olin J. Mitchell
ATTORNEY

Patented Dec. 11, 1951 2,578,298

UNITED STATES PATENT OFFICE 2,578,298

STEREOSCOPIC TELEVISION SYSTEM

Alfred N. Goldsmith, New York, N. Y.

Application October 25, 1946, Serial No. 705,735

3 Claims. (Cl. 178—5.6)

This invention relates to stereoscopic television systems and more particularly to method and means for quickly converting a television system from monocular viewing to binocular viewing to produce the effect of third dimension or depth. It also applies to associated stereosonic systems, and particularly to the conversion of an aural system from monaural to binaural.

Transmission of visual information by electricity over a single electrical transmission circuit is limited to the transmission of but one item of information at a time. It is necessary, therefore, that the image to be transmitted be broken down into a series of electrical impulses representative of image elements. Any convenient method of selection of the image elements may be used so long as the same sequence of selection is followed in the transmitter and receiver.

Two fundamental systems of scanning have proved themselves to be the most successful for the transmission of images. One has become known as the sequential line system of scanning, and the other has become known as the interlaced line scanning system. Because of the objectionable flicker which is quite evident in the sequential system of scanning for ordinarily practicable frame frequencies, the system of interlaced scanning has been generally accepted for use in television systems throughout the world.

In transmitting image elements by the interlaced scanning method, the odd numbered lines are sent first, the even numbered lines being omitted. Consequently, after one-half the lines have been sent, the end of the first "field" or set of alternate lines is reached. The scanning process then begins again, and the even numbered lines are sent. These lines fall into the spaces between the odd numbered lines previously sent.

In order to use the usual commercial power line frequency of 60 cycles per second for synchronization, the entire process of transmitting both the odd numbered and the even numbered lines occupies the time of $^1/_{30}$ second, and consequently 30 complete images are sent each second.

The transmission of stereoscopic images can be accomplished if the identity of the right and left eye views can be maintained throughout transmisison and reproduction. The identity can be maintained during transmission by sending right and left eye views alternately and at a rapid enough rate so that no flicker is evident. The identity can be maintained in reproduction by permitting the right eye to see only the right eye view and the left eye to see only the left eye view.

There have been a number of stereoscopic systems proposed, and for the purpose of explanation there will be illustrated a system employing vertical opaque strips whose width and spacing and distance from the image are chosen such that the image which is made up of alternate vertical strips representative of alternately the right and left eye view will be resolved into a stereoscopic image.

By rotating the direction of the scanning line from a horizontal position to a vertical position, it will be seen that the system of interlaced scanning is particularly adaptable to the transmission of stereoscopic images. For example, the odd line fields might represent the left eye image, and the even line fields might represent the right eye image.

According to this invention, there is provided a method and means for rotating the direction of scanning through 90°.

The ratio of the width to the height of an image is called the aspect ratio. An aspect ratio of 4 to 3 has generally been accepted as standard. It has been established at 4 to 3 to conform with the existing standard employed by the motion picture industry. A particular advantage in choosing this value is that it permits the televising of standard motion picture film without waste of any of the area of the scanning pattern.

Motion picture film of the type particularly suitable for stereoscopic image transmission by television is shown and described in my concurrently filed co-pending application, Serial No. 706,673, filed October 30, 1946, now Patent No. 2,566,700, granted September 4, 1951, entitled "Stereoscopic and Stereosonic Television Systems."

It follows that if the original aspect ratio of 4 to 3 is to be maintained, it is necessary to change the dimensions of the image in order to have the same aspect ratio after the direction of the scanning has been rotated through 90°. The scanning lines originally are closely $^4/_3$ of the height of the image. After the change, they are closely equal to the image height, and hence are closely $^3/_4$ as long as heretofore.

According to this invention, a method and means is provided for changing the aspect ratio of the scanning pattern, but without altering the aspect ratio of the normally viewed image.

When the normal scanning pattern has been rotated through 90°, the line scanning frequency must be increased to $^4/_3$ its former value in order to maintain the same resolution as before. This is because of the fact that it takes more scanning lines to fill up the larger dimension of the frame.

The necessity for increasing the number of lines will become evident from the following explanation. If we disregard the structure of the image elements, then we may consider the scanning lines themselves. As the image is viewed from a decreasing distance, a point will be reached where the scanning lines themselves become objectionably evident. If the scanning lines were of uniform brightness across the entire width and if they were perfectly adjacent, the scanning pattern would provide a perfectly uniform field of light. The lines would not be separately discernible, and the only structure visible would be that of the image elements previously considered. However, the limitations of television image tubes prevent the formation of such a uniform field of light, and it is found desirable to operate the tubes so that they produce narrow lines between which a very slightly dark region is visible. Under such conditions, the lines may be resolved by the eye if the image is viewed closely enough.

We may derive a simple equation relating the separation between elements and viewing distance $d$ at which the normal eye can just resolve the elements or lines. If the separation of the elements or lines is $s$ centimeters and the distance of viewing is $d$ centimeters, the ratio $s/d$ is approximately equal to the angle in radians subtended by the elements or lines at the eye. This angle at the viewing distance $d$ has a value of one minute or $^1/_{3438}$ radians. Accordingly $$=\frac{1}{3438}=\frac{s}{d} \text{ radians} \qquad (1)$$

and $$d=3438s \qquad (2)$$

The equation indicates that two image elements may just be distinguished from one another by the average eye when viewing distance is roughly 3500 times the distance between the centers of the picture elements.

There has been derived from the above equation a scanning pattern which results in a minimum number of lines or elements per inch, which will produce an image having individual lines or elements indiscernible to the eye. This has been accomplished as follows.

If, for example, we provide an image area having a height of $h$ inches and containing $n$ active scanning lines, the number of image elements $e$ that can be accommodated in a vertical direction is $kn$, where the $k$ is the utilization ratio, a number less than one and a factor that represents that some of the image elements straddling the scanning lines are lost or distorted. The values of $k$ determined by theory and experiment run from .6 to .95. The value .75 is adopted as a convenient basis for calculations.

Let us assume, for example, that half of the image elements, or $kn/2$, are black, and the remainder are white. The separation between the centers of two white elements is the height of the image divided by the number of white elements or $2h/kn$. This is a separation corresponding to $s$ in equation 2. We can find the corresponding distance $d$, at which the two white elements may be resolved, by substituting in Equation 2

$$d=3438s=\frac{6876h}{kn} \qquad (3)$$

At distance $d$ the elements may be resolved, but at a greater distance they appear to merge into a single element. If $d$ is smaller in value, no further detail is observed in the image structure, and the image structure becomes evident. $d$ may then be considered as a critical viewing distance. The equation indicates that the critical viewing distance increases with the size of the image, but decreases as the number of active scanning lines and the utilization ratio are increased. For example, with an image 8 inches high composed of 500 active scanning lines that reproduce 75% of the picture elements adequately, the critical viewing distance becomes 146 inches, or somewhat more than 12 feet. Such a dimension is purely theoretical and by reason of the fact that image viewing is aided by a certain amount of imagination, reasonably satisfactory results may be obtained at a viewing distance of 4 feet or ⅓ the tehoretical critical value. It does, however, indicate that in order to have equivalent resolution, there must be an increase in the number of scanning lines when the image dimension is increased, while keeping the viewing distance constant.

The line scanning frequency must therefore be increased, for the same resolution as before, to $^4/_3$ of the value for the former horizantal line scanning frequency. Thus, if a 525-line picture with horizontal scanning is to be changed to a vertically-scanned picture, the number of lines in the width of the picture and for unchanged line width will now be $^4/_3$ of 525 or 700 lines.

According to this invention, the same resolution is maintained between monoscopic and stereoscopic television by increasing the line scanning frequency when using the system for the reproduction of stereoscopic images.

The reproduction of stereosonic sound follows broadly the same principles that have been outlined for the reproduction of stereoscopic images. If the identity of the sound that would be heard by the left ear is maintained through transmission and reproduction, as well as the identity of the sound that would be heard by the right ear, the reproduction of stereosonic sound can be accomplished.

According to this invention, a method and means is provided for the transmission and reproduction of stereosonic sound in addition to stereoscopic images.

The primary object of this invention is to provide an improved television system.

Another object of this invention is to provide for the transmission and reproduction of stereoscopic images.

Still another object of this invention is to provide a convenient method and means for quickly converting a monocular system into a stereoscopic system.

Still another object of this invention is to provide in combination a stereoscopic television system and a stereosonic sound system.

Other and incidental objects of the invention will be apparent to those skilled in the art from a reading of the following specification and an inspection of the accompanying drawing in which Figure 1 shows schematically a preferred form of this invention;

Figure 1:
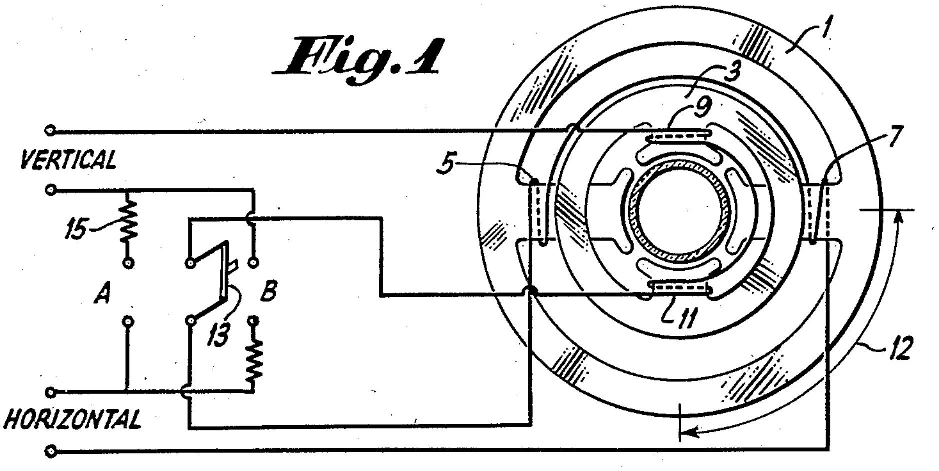

Turning now to Figure 1, there is shown a cathode ray tube deflecting circuit which may be used in television systems of the general character as that disclosed in the patent to Arthur W. Vance, No. 2,137,039, dated November 15, 1938 and assigned to the Radio Corporation of America. The system includes a cathode ray tube with horizontal and vertical ray deflecting coils, a horizontal deflection system for causing a sawtooth current wave at a desired line scanning frequency to pass through the horizontal ray deflecting coils, and a vertical deflection system for causing a sawtooth current wave at the desired framing frequency to pass through the vertical ray deflecting coils.

In Figure 1, there is shown a cathode ray tube deflecting device having metal cores 1 and 3. Core 1 supports horizontal deflecting coils 5 and 7. Core 3 supports vertical deflecting coils 9 and 11.

The necessary deflection of the cathode ray beam may be accomplished by using a cathode ray tube deflecting device such as that shown in the patent to William A. Tolson, No. 2,167,379, dated July 29, 1939, wherein both horizontal and vertical deflecting windings are placed in a steel tube and arranged concentrically and at right angles to each other.

The direction of scanning can be rotated 90° by physically rotating the cathode ray tube deflecting device containing cores 1 and 3 by 90°, as illustrated at 12.

The former deflection coils for vertical field deflection must be rotated around the neck of the kinescope to a position for horizontal field deflection.

However, the new horizontal deflection frequency remains the same as the former vertical deflection frequency.

The amplitude of the vertical line deflection must be changed to ¾ of the value of the former horizontal line deflection because of the smaller height of the picture as compared to the width of the picture. However, this reduced amplitude of deflection may occur more or less automatically for the following reason. The new vertical scanning frequency is 700×30 or 21,000 cycles per second (neglecting the higher harmonic thereof which contribute to the formation of the sawtooth wave). The old horizontal line scanning frequency was 525×30 or 15,750 cycles per second. Assuming the employment of magnetic deflection methods, the impedance of the line deflection coils when used for vertical line scanning instead of the former horizontal line scanning will be somewhat increased by the increase in the frequency of the line deflection currents and this will automatically reduce the deflection currents therethrough. Minor compensations of the line deflection currents can be accomplished by the insertion of a series impedance, e. g., a resistance, in the circuit of the line deflection coils if the currents are to be decreased, and by providing sufficient output power from the line deflection generator to produce full deflection at either 15,750 or 21,000 cycles.

The amplitude of the new horizontal or field deflection is increased one-third from that for the former vertical field deflection. The frequency of field deflection, however, remains the same. Thus, it is necessary that the field-deflection generator shall have sufficient output for use with the new horizontal field deflection, and this will require the insertion of a series impedance in the deflection coil circuits, or a reduction in deflection generator power, or some equivalent measure when the field deflection coils are used for vertical field deflection according to the present conventional and non-stereoscopic methods.

Double pole double throw switch 13 is connected to the vertical and horizontal deflection signal voltage in such a manner as to include in the circuit having vertical coils 9 and 11 a resistance 15 when in position A. When double pole double throw switch 13 is thrown to the B position, resistance 15 is cut out of the circuit including vertical deflection coils 9 and 11, and resistance 17 is included in the horizontal deflection coil circuit including horizontal deflection coils 5 and 7. When switch 13 is thrown to position A, resistance 17 is cut out of the horizontal deflecting circuit including horizontal coils 5 and 7.

Horizontal and vertical deflection signal voltages may be produced by deflection signal generators of the type shown and described in the William A. Tolson et al. U. S. Patent No. 2,101,520, dated December 7, 1937.

Various systems of stereoscopic television have been proposed. The system to which this invention is particularly adapted is known as the parallax stereogram. One such system is shown and described in the patent to Alda V. Bedford, No. 2,307,188, dated January 5, 1943.

Figure 2:
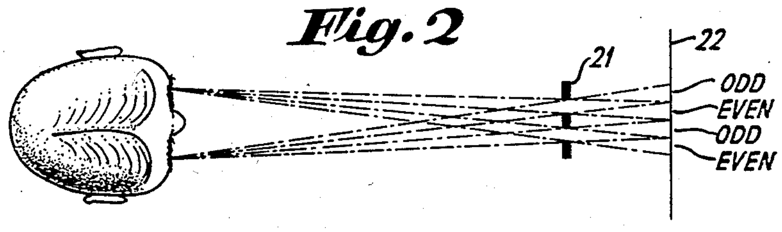
Figure 2 illustrates diagrammatically a system of stereoscopic viewing which may be employed in the practice of this invention.

Another system of stereoscopic image viewing to which this invention is particularly adapted is shown in Figure 2 and utilizes a plurality of vertical and opaque strips 21 whose width is equal to the spacing between each of the strips, and which are parallel to the vertical scanning lines. The width and position of the strips 21 are dependent upon the separation of scanning lines in such a manner that the left eye of the observer, for example, will see only the odd lines, and the right eye of the observer will see only the even scanning lines. Surface 22 represents the fluorescent screen of a kinescope of a television receiver. The odd and even marked spaces represent the odd and even lines of a scanning pattern.

It will be seen that if an image representative of the left eye view is transmitted during scanning of the odd lines or during the interval allocated to the odd line field, and the image representative of the right eye view is transmitted only during the transmission of the even lines or the even line field, the original image in three dimensions may be reproduced in the receiving set.

Figure 3:
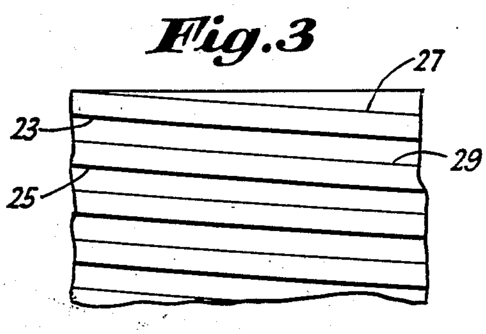
Figures 3 and 4 illustrate schematically changes in scanning procedure which may be followed in the practice of this invention.

There is shown in Figure 3 a scanning pattern of the type employed for the transmission of television images. The odd lines are represented by the heavy lines 23, 25, etc., and the even lines are represented by the light lines 27, 29, etc. The slope shown in Figure 3 is exaggerated over the actual slope of the television scanning line.

Figure 4:
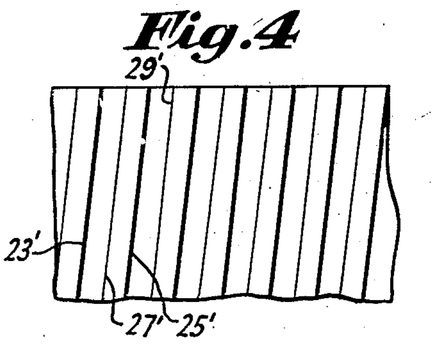

It will be seen from Figure 4 that by turning the scanning direction through 90°, a greater number of scanning lines are necessary to provide the same aspect ratio as that of the scanning pattern shown in Figure 3.

It is obvious that the methods of this invention can be equally applied to electrostatically deflected beams by corresponding control of the deflection voltages.

Figure 5:
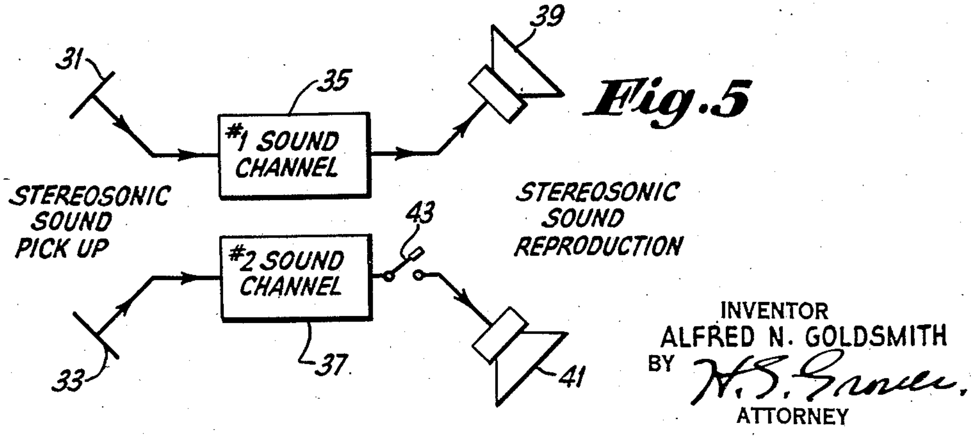
Figure 5 shows by block diagram a method and means for including stereosonic sound transmission and reproduction in a system involving the practice of this invention.

Turning now to Figure 5, there is schematically illustrated a stereosonic sound pickup transmission and reproduction system. Sound pickup device 31, which may be a microphone of any of the well-known types, is positioned in such a manner that it will pick up the sound that would normally register in one ear, say, for example, the right ear. A similar microphone 33 is positioned so that it will register the sound which would normally be picked up by the other ear, say, for example, the left ear. The exact nature of the directional characteristics of the microphone, and their relative placement and mode of association are not a part of this invention. It may be mentioned that a number of alternative dispositions have been proposed, any one of which may be used as here set forth.

The electrical signals generated by microphone 31 are illustratively transmitted through No. 1 sound channel 31, and the electrical signals generated by microphone 33 are generated through the No. 2 sound channel 37. The sound channels may include amplifying systems, wire transmission circuits, radio transmission circuits, or the like.

Loudspeaker 39 is connected to the first sound channel 35 and reproduces the sound picked up by microphone 31. Loundspeaker 41 is connected to the second sound channel 37 through switch 43.

Switch 43 is included to quickly convert the system from a normal sound system to a stereosonic sound system.

Loudspeakers 39 and 41 are so positioned that the sound from loudspeaker 39 reaches the right ear of the listener more directly than the sound reproduced by speaker 41. Likewise, the sound reproduced by speaker 41 reaches the left ear of the listener more directly than the sound reproduced by speaker 39.

Loudspeakers 39 or 41 may alternatively take the form of individual earphones of a headset which may be worn by the listener in such a manner that the sound reproduced by the signals passed through the first sound channel 35 will be heard only by the right ear, and the sound reproduced by the signals passing through the second sound channel 39 will be heard only by the left ear.

According to a preferred form of this invention, all of the operations referred to above can be consummated substantially simultaneously by either electrically or mechanically coupling the device employed for rotating the direction of the scanning through 90°, actuating switch 13 of Figure 1, positioning the screen 21 of Figure 2, and actuating switch 43 of Figure 5.

Figure 6:
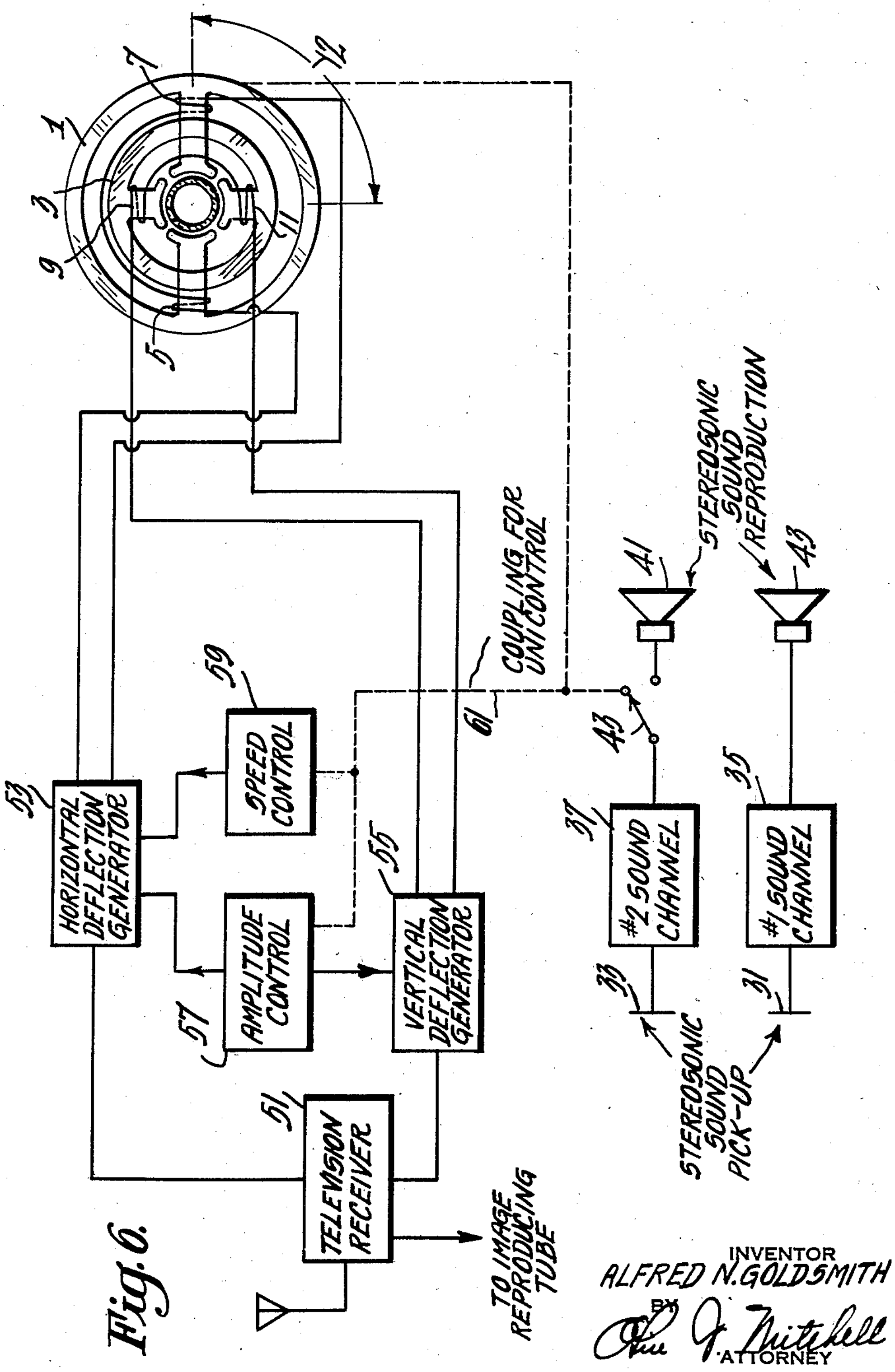
Figure 6 shows by block diagram the coupling between the various elements to provide simultaneous change from monoscopic to stereoscopic television.

In Figure 6 there is shown a television receiving system capable of being changed from monoscopic to stereoscopic.

A television receiver 51 intercepts video signals in either monoscopic or stereoscopic form. A horizontal deflection generator, 53, and a vertical generator, 55, are controlled in amplitude by amplitude control, 57. The amplitude control, 57, may take the form of switch, 13, shown in Figure 1.

Speed control, 59, may take the form of any of the well known oscillator frequency adjustments. This control, 59, adjusts the speed of the horizontal oscillator to maintain substantially the same detail in both monoscopic and stereoscopic television.

Coupling, 61, is provided to simultaneously actuate amplitude control, 57, speed control, 59, sound switch, 43, and yoke rotator, 12. This enables convenient and rapid change from monoscopic to stereoscopic television.

Having thus described the invention, what is claimed is:

1. In a television receiver of the type employing electronic beam scanning, and having a first electrical circuit for controlling the scanning of said beam in a horizontal direction, a second electrical circuit for controlling the scanning of said beam in a vertical direction, a screen adapted to be placed in the viewing path of said receiver, said screen when in said path presenting stereoscopic images individually to the right and left eyes of an observer, means for changing from a monoscopic to stereoscopic receiver comprising in combination means for rotating the direction of said electron beam scanning through 90 degrees, means for maintaining the original aspect ratio comprising in combination an auxiliary impedance of fixed value in each of said circuits, an electrical switching device for removing one or the other of said auxiliary impedances from said circuits, and means for increasing the frequency of said first scanning circuit in inverse proportion to the change in aspect ratio caused by said rotation and means connecting said means for rotating the direction of said electron beam scanning, and said means for maintaining the original aspect ratio to provide simultaneous action for converting said television system from a monoscopic system to a stereoscopic system.

2. In a television receiver of the type employing electronic beam scanning, and having a first electrical circuit for controlling the scanning of said beam in a horizontal direction, a second electrical circuit for controlling the scanning of said beam in a vertical direction, a screen adapted to be placed in the viewing path of said receiver, said screen when in said path presenting stereoscopic images individually to the right and left eyes of an observer, means for changing from a monoscopic to stereoscopic receiver comprising in combination means for rotating the direction of said electron beam scanning through 90 degrees, means for maintaining the original aspect ratio comprising in combination an auxiliary impedance of fixed value in each of said circuits, an electrical switching device for removing one or the other of said auxiliary impedances from said circuits, and means for increasing the frequency of said first scanning circuit in inverse proportion to the change in aspect ratio caused by said rotation, an audio frequency channel adapted to transmit signal energy representative of the sound registered by one ear of a listener, a second audio frequency signal adapted to transmit signal energy representative of the sound registered by the other ear of said listener, and a switching means for making inoperative one of said audio frequency signal channels, and means connecting said means for rotating the direction of said electron beam scanning, said means for maintaining the original aspect ratio and said switching means to provide simultaneous action for converting said television system from a monoscopic system to a stereoscopic system.

3. In a television receiver of the type employing electronic beam scanning, and having a first electrical circuit for controlling the scanning of said beam in a horizontal direction, a second electrical circuit for controlling the scanning of said beam in a vertical direction, a screen adapted to be placed in the viewing path of said receiver, said screen when in said path presenting stereoscopic images individually to the right and left eyes of an observer, means for changing from a monoscopic to a stereoscopic receiver comprising in combination means for rotating the direction of said electron beam scanning through 90 degrees and placing said screen in said path, means for maintaining the original aspect ratio comprising in combination an auxiliary impedance of fixed value in each of said circuits, an electrical switching device for removing one or the other of said auxiliary impedances from said circuits, and means for increasing the frequency of said first scanning circuit in inverse proportion to the change in aspect ratio caused by said rotation, an audio frequency channel adapted to transmit signal energy representative of the sound registered by one ear of a listener, a second audio frequency signal adapted to transmit signal energy representative of the sound registered by the other ear of said listener, and a switching means for making inoperative one of said audio frequency signal channels, and means connecting said means for rotating the direction of said electron beam scanning, said means for maintaining the original aspect ratio, said screen positioning means and said switching means to provide simultaneous action for converting said television system from a monoscopic system to a stereoscopic system.

ALFRED N. GOLDSMITH.

REFERENCES CITED

The following references are of record in the file of this patent:

UNITED STATES PATENTS

| Number | Name | Date |
|---|---|---|
| 1,934,821 | Rudenberg | Nov. 14, 1933 |
| 1,978,684 | McCreary | Oct. 30, 1934 |
| 2,039,119 | Schlesinger | Apr. 28, 1936 |
| 2,072,527 | Nicolsŏn | Mar. 2, 1937 |
| 2,074,764 | Tolson | Mar. 23, 1937 |
| 2,107,464 | Zworykin | Feb. 8, 1938 |
| 2,261,309 | Stuart | Nov. 4, 1941 |
| 2,293,147 | Kell | Aug. 18, 1942 |
| 2,297,949 | Franswworth | Oct. 6, 1942 |
| 2,310,197 | Hansell | Feb. 2, 1943 |